Patented May 13, 1941

2,241,900

UNITED STATES PATENT OFFICE 2,241,900

PREPARATION OF MODIFIED OLEFIN-SULPHUR DIOXIDE POLYSULPHONES

Merlin Martin Brubaker and Jesse Harmon, Wilmington, Del., assignors to E. I. du Pont de Nemours & Company, Wilmington, Del., a corporation of Delaware No Drawing. Application April 26, 1938, Serial No. 204,309

6 Claims. (Cl. 260—80)

This invention relates to olefin resins and, more particularly, to improved olefin polysulphone resins and the method of preparing same.

The formation of polysulphone resins by the reaction of olefins, either singly or in admixtures, with sulphur dioxide is known. These unmodified polysulphone resins possess properties which adapt them for use as molding compounds and as plastics generally. However, the value of these unmodified polysulphone resins and their field of use is restricted to some extent by their tendency toward brittleness and the fact that they are difficultly fusible in many instances; these characteristics of the polysulphone resins form a serious objection to the use of these resins for molding purposes and in the field of plastics generally.

An object of the present invention is to provide new olefin polysulphone resins and a method of preparing same. A further object is to provide modified olefin-sulphur dioxide resins having greater fusibility, toughness, and general utility than the corresponding unmodified olefin-sulphur dioxide resins. A still further object is to provide new olefin-sulphur dioxide resins better adapted for use as molding compounds than any resins of this type heretofore known.

The above objects are accomplished according to the present invention by reacting a mixture of one or more mono-olefin hydrocarbons, as more fully defined below, and a negatively substituted vinyl or vinylidene compound with sulphur dioxide to give a resinous reaction product. While the exact structure of the complex molecule formed by this reaction is not definitely known, the molal ratio of vinyl or vinylidene compound to mono-olefin hydrocarbon is less than 1–1 and, in most instances, less than 0.5–1, so that the resinous reaction product may be more accurately considered a modified olefin-sulphur dioxide resin rather than a modified vinyl or vinylidene compound-sulphur dioxide resin.

The olefins coming within the scope of the present invention are the mono-olefin hydrocarbons containing at least two ethylenic hydrogen atoms and in which, when the olefin is acyclic, the ethylenic linkage is within two carbon atoms of the end of the carbon chain. Otherwise expressed, the olefins contemplated are unsaturated hydrocarbons which (a) have as their only unsaturation a single ethylenic double bond, (b) contain at least two ethylenic hydrogen atoms and (c) if acyclic, as is usually the case, have the ethylenic linkage within two carbon atoms of the end of the carbon chain.

The following examples, in which proportions are in parts by weight unless otherwise stated, illustrate specific embodiments of the present invention:

*Example I.*—A solution of 0.1 part of benzoyl peroxide and 0.1 part of ascaridol in 50 parts of absolute ethanol was mixed with 10.5 parts of propylene, 24 parts of sulphur dioxide, and 5 parts of methyl methacrylate in a pressure vessel at about —80° C. The vessel was sealed, packed in ice, and allowed to come to room temperature, i. e. about 25° C., in about three hours. After standing at room temperature for 7 days, the vessel was cooled and opened. The propylene-sulphur dioxide-methyl methacrylate polymer formed had separated as a white amorphous precipitate The alcohol and polymer precipitate. The alcohol and polymer precipitate mixture was thoroughly mixed in several volumes of ether, filtered, and the polymer dried, 19.8 parts being obtained It was further purified by grinding and passing through a 60-mesh screen, agitating for 3 days with an 80:20 methanol-acetone mixture, filtering and drying By analysis this purified polymer contained 22.05% sulphur as compared to unmodified propylene polysulphone, which contains 30.2% sulphur. A 7 gram sample was heated for 5 minutes in a 2" cylindrical mold at 10,000 pounds pressure between platens heated at 160–165° C. The resultant molding was colorless, transparent, completely fused, hard and tough; at 130° C. it softened just enough to become barely flexible.

A further quantity of the modified polymer was prepared and purified as above. By analysis it contained 22.95% sulphur. This polymer was ground to a fine powder and extracted with toluene for four days; the extracted polymer was found to contain 24.4% sulphur. This shows that most of the methyl methacrylate was chemically combined with the propylene polysulphone because, otherwise, it would have been dissolved in the toluene leaving an extracted product which would have analyzed for propylene polysulphone (30.2% sulphur).

For purposes of comparison, straight propylene polysulphone was prepared and purified as in Example I, except that the methyl methacrylate was omitted. A 7 gram sample of this polymer molded under the identical conditions above gave a molding which, although colorless and hard, was brittle, partially opaque, and incompletely fused, showing that the modified polymer was distinctly more readily fused and tougher.

Example I was repeated using 2.5 parts of methyl methacrylate and one part of methyl methacrylate in two separate runs, the resulting modified polymer in each instance being more readily fusible and tougher than straight propylene polysulphone but the degree of improvement decreasing as the proportion of methyl methacrylate was decreased.

Example I was also repeated omitting the benzoyl peroxide catalyst, a yield of 11.5 parts of polymer being obtained, and, again, omitting the ascaridol catalyst, the low yield of 2.9 parts being obtained. This is illustrative of the fact that improvement in yield of the polymer can be effected by proper selection of catalysts.

Example II.—The preparation of the polysulphone in Example I was repeated except that 4.3 parts of vinyl acetate were substituted for the methyl methacrylate. A yield of 22.5 parts of a white amorphous resin containing 29.13% of sulphur, were obtained. When molded under the conditions set forth above, a colorless, hard, translucent molding resulted.

Example III.—The preparation of the polymer as in Example I was again repeated except that 3.6 parts of methyl vinyl ketone were substituted for the methyl methacrylate. The polymer obtained was a white amorphous powder, insoluble in common organic solvents. The yield was 8.3 parts. When molded under the conditions set forth in Example I, it gave a completely fused product.

Example IV.—The preparation of the polymer as in Example I was repeated using 3.4 parts of methacrylic nitrile in place of the methyl methacrylate. The product obtained was a finely divided white powder and amounted to 13 parts. This polymer was likewise insoluble in common organic solvents such as chloroform, acetone, ethanol, toluene, dioxan, butyl acetate, glycol monomethyl ether, and high flash naphtha. When molded by the technique described in Example I, the resin gave a hard, tough, translucent article.

Example V.—4.3 parts of methyl acrylate were substituted for the methyl methacrylate in the preparation of a polymer in accordance with Example I. 7.5 parts of a white powder were obtained. This polymer was soluble in dioxan but insoluble in the other solvents given in the preceding example. When molded under the conditions set forth in Example I, it gave a colorless, hard, tough, transparent article.

Example VI.—Example I was again repeated using 5 parts of styrene in place of the methyl methacrylate. 8 parts of a white powder were obtained. This polymer was soluble in dioxan but insoluble in the other solvents listed in Example IV.

Example VII.—A pressure flask was cooled to about —80° C. and charged with 5 parts of methacrylic acid, 56 parts of n-butylene (a mixture of 1-butene and 2-butene), 213 parts of sulphur dioxide, and 0.5 part of benzoyl peroxide dissolved in 10 parts of absolute ethanol. The flask was sealed, shaken vigorously, and stored at room temperature for 23 hours, at the end of which time the reaction mixture had set up as a white waxy looking mass. The flask was opened and the product was forced into hot water to drive off the excess sulphur dioxide, and then dried. 51 parts of a hard and bone-like polymer were obtained. After being ground and molded under the conditions set forth in Example I, this polymer gave a transparent and hard molding. The resin was insoluble in chloroform which is in contrast to the unmodified n-butylene polysulphone resin prepared in the same manner.

Example VIII.—A pressure flask was charged at about —80° C. with 26 parts of n-butylene, 34 parts of sulphur dioxide, 6.5 parts of methyl methacrylate and a solution of 0.25 part of benzoyl peroxide in 6 parts of absolute ethanol. The flask was sealed, shaken vigorously, and allowed to stand at room temperature for 20 days, during which time a solid mass of white resin was formed. The resin was dissolved in chloroform and the solution thus obtained was poured into ether to precipitate the resin. 62.5 parts of the precipitated resin were obtained. This resin was not only soluble in chloroform but also in dioxan and acetone. When purified and molded by the method of Example I, it gave a hard, colorless molding.

Example IX.—A pressure flask was charged at about —80° C. with 14 parts of n-butylene (a mixture of 1-butene and 2-butene), 4.3 parts of vinyl acetate, 24 parts of sulphur dioxide, and 0.1 part of ascaridole. The flask was sealed, shaken thoroughly, and allowed to stand at room temperature for 3 days, at the end of which time a vitreous mass had formed. This mass was dissolved in 150 parts of chloroform and the polymer precipitated by pouring the solution slowly into ether. The precipitate was in the form of white amorphous strands. The resin weighed 18.2 parts and, after being ground and purified by extraction with ether, it contained 25.64% sulphur by analysis as compared to 26.65% sulphur content of unmodified n-butylene polysulphone. The resin molded as set forth in Example I gave a transparent and hard molding.

It will be understood that the above examples are merely illustrative and may be varied widely without departing from the scope of the present invention.

The invention is broadly applicable to the olefins as defined heretofore and, especially, to the straight chain mono-olefin hydrocarbons having 3—4 carbon atoms, i. e., propylene, 1-butene, and 2-butene, or mixtures of these. Other olefin hydrocarbons well adapted for use in the invention include ethylene, isobutylene, 1-pentene, 2-pentene, 1-hexene, 1-octene, 1-nonene, cyclohexene, and 3-methylcyclohexene.

This invention is likewise broadly applicable to the vinyl or vinylidene compounds as defined herein. Among such vinyl or vinylidene compounds may be mentioned methacrylic nitrile, methacrylic acid, esters of methacrylic acid as methyl methacrylate, esters of acrylic acid as methyl acrylate, and vinyl acetate, methyl vinyl ketone, and styrene. Many other vinyl or vinylidene compounds will occur to those skilled in the art; all of these compounds fall within that class of unsaturated organic compounds represented by the formula

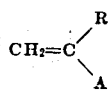

where R is hydrogen or alkyl and A is a radical selected from the group consisting of

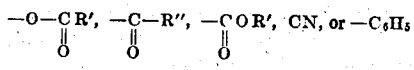

where R' is hydrogen or alkyl and R'' is alkyl.

The proportion of olefin to vinyl or vinylidene compound may be varied between wide limits and, in specific instances, the proportion will be determined by the properties desired in the final product. Preferably, 0.04 to 0.5 mol of vinyl or vinylidene compound to one mol of olefin hydrocarbon will be employed although the ratio of vinyl or vinylidene compound may be considerably increased if desired and even approach a 1-1 ratio. However, as a matter of practical operation and economy, the use of more than 0.2 mol of vinyl or vinylidene compound to one mol of olefin hydrocarbon is not of great value because of the inhibiting effect of the vinyl or vinylidene compound, when used in higher proportions, on the formation of the polysulphone resin. In the examples, all of which illustrate practical embodiments of the invention, a ratio of 0.2 mol of vinyl or vinylidene compound to one mol of olefin hydrocarbon has been used in the majority of instances and in no case has a higher proportion of vinyl or vinylidene compound been used. The molal ratio of sulphur dioxide to olefin is preferably at least 1-1. Since excess sulphur dioxide may be readily removed, the upper limit of sulphur dioxide to olefin is simply a matter of expediency; a proportion as high as 4 mols of sulphur dioxide to one mol of olefin hydrocarbon is frequently desirable as the excess sulphur dioxide serves as a diluent. The use of less than one mol of sulphur dioxide per one mol of olefin is by no means excluded as the excess olefin can be removed.

The reaction of the present invention may be carried out under the influence of catalysts such as ultra violet light, hydrogen peroxide, and various organic peroxides such as dibenzoyl peroxide, ascaridole, acetyl benzoyl peroxide, dibutyryl and dilauryl peroxides, partially oxidized aldehydes which contain peroxide, acetone peroxide, urea peroxide, succinic acid peroxide, and the like. It is preferred to add the catalyst as a solution in a small amount of an alcohol such as ethanol. An alcohol does not function as a catalyst per se but it is valuable as an adjuvant or promoter for the peroxide catalysts. In many instances, it is advantageous to use a mixture of two or more peroxidic materials as the catalyst and this is illustrated in the examples. The alcohol may be used in amounts ranging from 0.1 to 5 parts, by weight, for each part of olefin. When large proportions of alcohol are used, it functions as a diluent for the reaction mixture, as well as an adjuvant for the catalyst. The usual effect of diluents is to give a product in a form which may be more readily isolated and purified. Other compounds such as chloroform, ether, benzene, or an excess of sulphur dioxide over the stoichiometrical amount required to act with the olefin, may be used as diluents for the reaction mixture. The amount of diluent may be varied widely, usually from 1-5 parts per one part of olefin being employed.

It is convenient to carry out the preparation of the herein considered modified olefin-sulphur dioxide polysulphones by mixing the liquid sulphur dioxide, liquefied olefin, vinyl or vinylidene compound, catalyst mixture, and diluent in a sealed pressure reaction vessel and allowing this to stand at room temperature until the reaction has come to completion. Aside from convenience in operation, the reaction temperatures are limited only by the stability of the reactants and products formed, any temperature not causing undesirable decomposition being operative. The optimum reaction temperature for any particular combination of reactants will be determined by preliminary experimentation as those skilled in the art will understand but, generally, temperatures between 0° and 50° C. have been found most satisfactory.

The reaction period may vary from a few hours to several days dependent upon the reactants, catalysts, diluents, and temperatures being used. Due to the nature of the reactants it is ordinarily most practical to carry the process out under superatmospheric pressure in closed vessels but this does not mean that the pressures are critical.

The modified olefin-polysulphone resins of the present invention are particularly useful for the preparation of molded articles. They may be modified with plasticizers, fillers, pigments, dyes, softeners, or other natural or synthetic resins, as will occur to those skilled in the plastics art. These modified resins are likewise useful when dissolved in suitable organic solvents as coating compositions, either alone or in admixture with the resins, pigments, dyes, plasticizers, and the like, used in the coating art. Such compositions find use for coating surfaces such as wood, metals, glass, textiles, paper, stone, brick, concrete, plaster, and the like.

An advantage of the present invention is that it provides a means of improving the properties of the olefin-sulphur dioxide polysulphone resins. A particular advantage of the present invention is that it makes the resins more readily fusible and much less brittle than the corresponding unmodified polysulphone resins. This is particularly noticeable with respect to the propylene-sulphur dioxide polysulphones. The straight propylene polysulphone may be molded under pressure in the temperature range of 180-200° C., whereas the propylene polysulphone modified according to the present invention is readily fusible at much lower temperatures such as 165° C.

As many apparently widely different embodiments of this invention may be made without departing from the spirit and scope thereof, it is to be understood that the invention is not limited to the specific embodiments thereof except as defined in the appended claims.

We claim:

1. Process of preparing modified olefin-sulphur dioxide polysulphones which comprises reacting sulphur dioxide with a mixture of 1-butene and 2-butene, and another organic compound having the formula

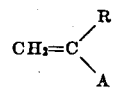

wherein R is selected from the group consisting of hydrogen and alkyl, and A is selected from the group consisting of $$-O-\underset{\underset{O}{\|}}{C}R', \quad -\underset{\underset{O}{\|}}{C}-R'', \quad -\underset{\underset{O}{\|}}{C}OR', \quad CN, \text{ and } -C_6H_5$$

wherein R' is selected from the group consisting of hydrogen and alkyl and R'' is alkyl, said mixture having a proportion of one mol of said butenes to 0.04-0.2 mol of said other organic compound.

2. Process of preparing modified olefin-sulphur dioxide polysulphones which comprises reacting sulphur dioxide with a mixture of 2-butene and another organic compound having the formula

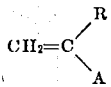

wherein R is selected from the group consisting of hydrogen and alkyl, and A is selected from the group consisting of

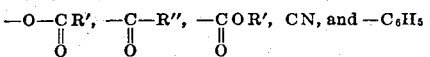

wherein R' is selected from the group consisting of hydrogen and alkyl and R'' is alkyl, said mixture having a proportion of one mol of 2-butene to 0.04–0.2 mol of said other organic compound.

3. Process of preparing modified olefin-sulphur dioxide polysulphones which comprises reacting sulphur dioxide with a mixture of propylene and another organic compound having the formula

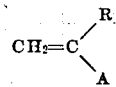

wherein R is selected from the group consisting of hydrogen and alkyl, and A is selected from the group consisting of

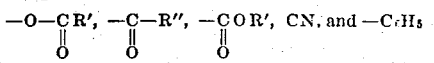

wherein R' is selected from the group consisting of hydrogen and alkyl and R'' is alkyl, said mixture having a proportion of one mol of propylene to 0.04–0.2 mol of said other organic compound.

4. Process of preparing modified olefin-sulphur dioxide polysulphones which comprises reacting sulphur dioxide with a mixture of at least one straight chain mono-olefin hydrocarbon having at least two ethylenic hydrogen atoms and from 3–4 carbon atoms, inclusive, and another organic compound having the formula

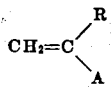

wherein R is selected from the group consisting of hydrogen and alkyl, and A is selected from the group consisting of

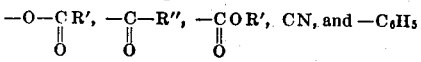

wherein R' is selected from the group consisting of hydrogen and alkyl and R'' is alkyl, said mixture having a proportion of one mol of mono-olefin hydrocarbon to 0.04–0.2 mol of said other organic compound.

5. Process of preparing modified olefin-sulphur dioxide polysulphones which comprises reacting sulphur dioxide with a mixture of 1-butene and 2-butene, and methacrylic acid, said mixture having a proportion of one mol of said butenes to 0.04–0.2 mol of said methacrylic acid.

6. Process of preparing modified olefin-sulphur dioxide polysulphones which comprises reacting sulphur dioxide with a mixture of propylene and vinyl acetate, said mixture having a proportion of one mol of propylene to 0.04–0.2 mol of said vinyl acetate.

MERLIN MARTIN BRUBAKER.
JESSE HARMON.